United States Patent [19]

Inoue

[11] 4,077,492
[45] Mar. 7, 1978

[54] AUTOMATIC LUBRICATORS FOR RINGS OF A SPINNING MACHINE

[75] Inventor: Yasuo Inoue, Amagasaki, Japan

[73] Assignee: Hiroyuki Kanai, Ashiya, Japan

[21] Appl. No.: 717,185

[22] Filed: Aug. 24, 1976

[51] Int. Cl.² .............................................. F16N 7/12
[52] U.S. Cl. ...................................... 184/64; 184/102
[58] Field of Search ................. 184/64, 102, 53, 6.15, 184/6 R, 16, 19, 22, 25, 102

[56] References Cited

U.S. PATENT DOCUMENTS

| | | | |
|---|---|---|---|
| 776,262 | 11/1904 | Royle | 184/64 |
| 827,283 | 7/1906 | Anderson | 184/64 |
| 1,380,059 | 5/1921 | Grunwald | 184/64 |
| 1,391,466 | 9/1921 | Fekete | 184/64 X |
| 1,639,749 | 8/1927 | Pierce | 184/64 UX |
| 1,770,036 | 7/1930 | Johnson | 184/64 |
| 2,131,441 | 9/1938 | Jong et al. | 184/102 X |
| 2,583,457 | 1/1952 | Woodall | 184/102 |
| 2,831,314 | 4/1958 | Mulholland | 184/64 X |
| 3,116,012 | 12/1963 | August | 184/64 X |

FOREIGN PATENT DOCUMENTS 547,621   9/1942   United Kingdom ................. 184/64

*Primary Examiner*—David H. Brown
*Attorney, Agent, or Firm*—Wenderoth, Lind & Ponack

[57] ABSTRACT

A holder for the ring of ring spinning machine and ring twisting machine has an oil-retaining substance disposed therein and at least one oil supply tank detachably fitted in a recess therein. The oil supply tank has an opening at its bottom leading to the oil-retaining substance for automatic lubrication of the ring.

9 Claims, 22 Drawing Figures

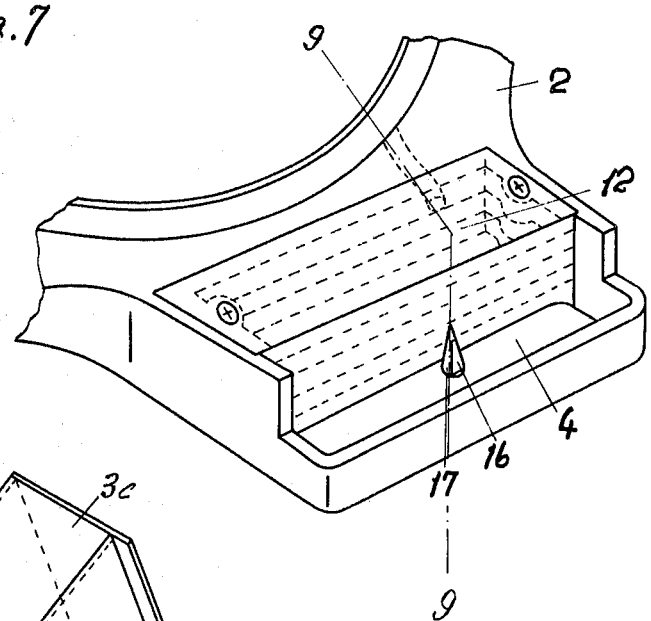
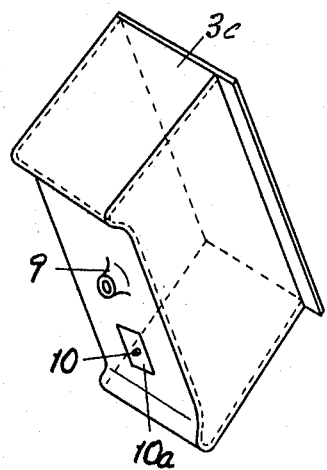
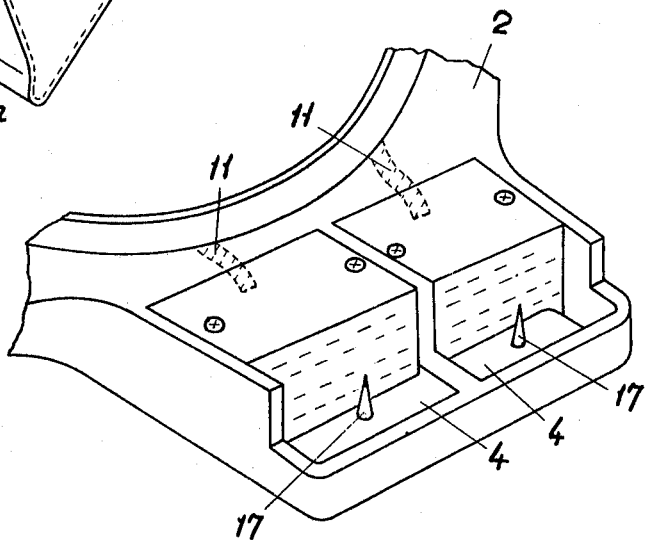

AUTOMATIC LUBRICATORS FOR RINGS OF A SPINNING MACHINE

This invention relates to lubricators in holders for rings of a ring spinning machine or a ring twisting machine and is intended to minimize the difficulty in lubricating by detachably mounting an oil supply tank in the holder and also to prevent spun yarn from being stained with oil which oozes out on the surface of the ring holder.

The conventional holder 2 of the ring spinning or ring twisting machine has an oil supply tank 1 fitted therein, as shown by FIG. 1. In such a structure, however, the oil supply tank 1 must be limited in size and kept small in size, with the result that the oil storing capacity thereof is small and the quantity of oil with which it can be replenished is limited. Therefore, in the case where a desired quantity of oil is supplied to the ring, replenishing must be carried out frequently. In addition, oil which oozes out makes the surface of the holder oily, with the result that short fibers, i.e., so-called "fly", stick to the oily surface of the holder, which can cause oil-stained spun yarn.

The present invention seeks to eliminate the above-described defects in the prior art device. According to the present invention, one or more recesses are provided at the front part of the holder body to accommodate therein an oil supply tank and an oil-retaining substance is provided in the recess, and when an oil supply tank having an opening therein is fitted into the recess, lubrication of the ring of ring spinning or ring twisting machine is automatically carried out.

The nature and advantages of the present invention are described below, with reference to the accompanying drawings, in which:

FIG. 6 is a perspective view of an oil supply tank having at its bottom a protruding oil aperture;

FIG. 7 is a perspective view of the main part of a still further embodiment of the holder of the present invention;

FIG. 8 is a perspective view of the main part of another embodiment of the holder of the present invention;

EMBODIMENT NO. 1

Figure 1:
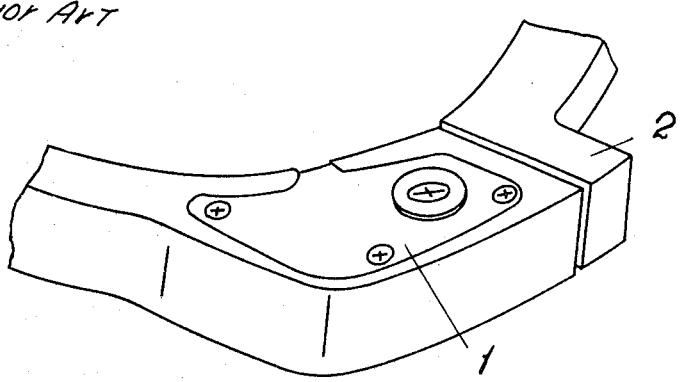
FIG. 1 is a perspective view of the main part of a conventional holder for rings.
Figure 2A:
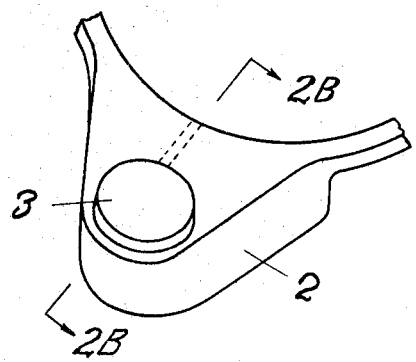
FIG. 2A is a perspective view of the main part of an embodiment of the holder of the present invention.
Figure 4A:
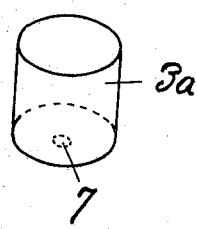
FIG. 4A and FIG. 4B are perspective views showing forms of oil supply tanks having a bottom oil aperture.
Figure 3A:
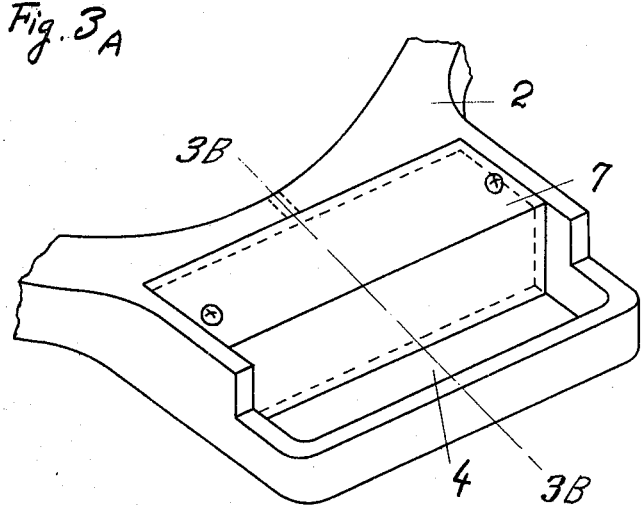
FIG. 3A is a perspective view of another embodiment of the holder of the present invention.
Figure 3B:
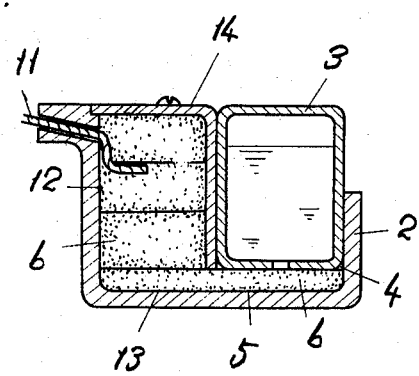
FIG. 3B is a section taken on line 3B—3B of FIG. 3A.

FIG. 2A and FIG. 3B show the construction of a main part of an embodiment of the holder according to the present invention. One or more (if necessary) upwardly open, closed bottom recesses 4 are provided in the holder 2 so that an oil supply tank 3a and made of synthetic resin, metal or the like, and as shown in FIG. 4A can be detachably fitted therein so as to be easily replaced. An oil substance 6 is disposed in the bottom 5 of the recess. At the bottom of the oil supply tank 3 is an oil opening 7 which is 1 – 5 m.m. in diameter. By bringing the oil supply tank 3a into direct contact with the oil-holding substance 6, oil can be caused to flow into the oil-holding substance. A wick 11 extends through the holder 2 to the point where the rings are to be lubricated.

Figure 2B:
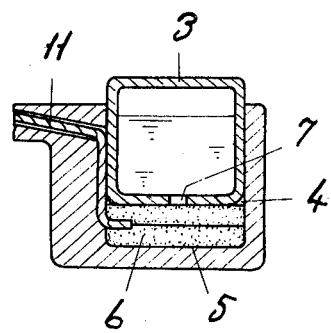
FIG. 2B is a section taken on the line 2B—2B of FIG. 2A.
Figure 4B:
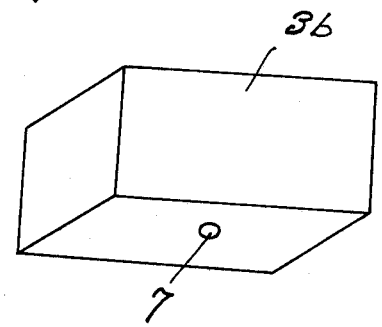

An oil flow adjusting tank 12 can be provided in the holder as shown in FIGS. 3A and 3B for adjustment of the quantity of oil flowing through the holder. The oil flow adjusting tank 12 is filled with the oil-holding substance 6, as shown in FIG. 3B. This oil-holding substance 6 is disposed contiguously to the bottom part 13 of the oil flow adjusting tank 12 and to the bottom part 5 of the recess 4. A partition 14 is provided between the recess 4 and the oil flow adjusting tank 12. Wick 11 is also provided as in FIGS. 2A and 2B. The oil supply tank 3b as shown in FIG. 4B is fitted in the recess 4, and when the oil in the oil supply tank 3b is used up, the oil supply tank is replaced by a full tank.

EMBODIMENT No. 2

Figure 5:
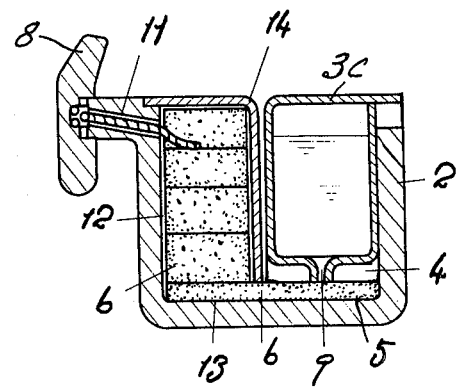
FIG. 5 is a cross section of the main part of a further embodiment of the holder of the present invention.

FIG. 5 shows another embodiment of the present invention. This is similar to the embodiment of FIGS. 3A and 3B except that a protruding oil aperture 9 is provided at the bottom of the oil supply tank 3c as shown in FIG. 6. The oil supply tank 3c is fitted in the recess 4 in such a fashion that the tip of the protruding oil aperture 9 makes contact with the oil retaining substance 6 disposed at the bottom 5 of the recess 4. Numeral 10 denotes an air outlet and a seal 10a partially contacts the oil supply tank 3c in such a fashion that it opens only when pressure is applied to the inside. Thus, it facilitates the oil supplying action. Normally, a membrane is formed between the oil supply tank 3c and the seal 10a due to surface tension of the oil, for sealing the tank.

In the above Embodiments No. 1 and No. 2, oil in the oil supply tank flows into the oil-retaining substance and is fed to the circumference of the ring, via the oil wick 11, by capillary action. Thus, lubrication of the ring surface is carried out, yet the flow of the oil from the oil aperture at the bottom of the oil supply tank into the oil-retaining substance corresponds to the quantity of oil oozed out onto the surface of the ring 8.

EMBODIMENT NO. 3

Figure 9:
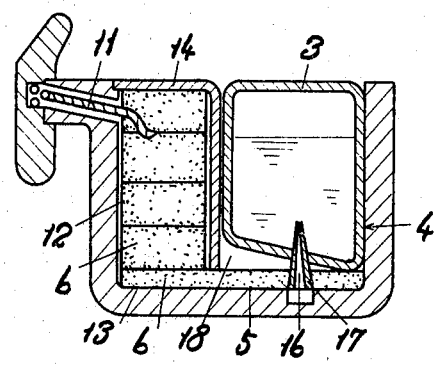
FIG. 9 is taken along line 9—9 of FIG. 7.
Figure 10:
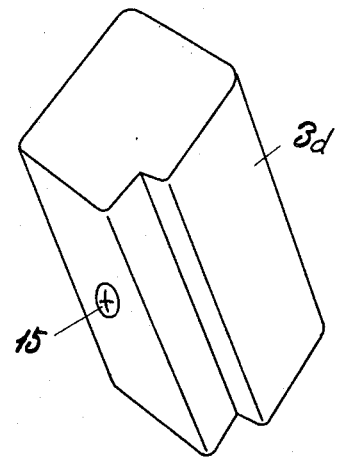

FIGS. 7 and 10 show respectively the construction of the main part of different embodiments of the present invention, in which a single oil supply tank 3d made of synthetic resin, metal or the like as shown by FIG. 10 and a single recess 4 are provided as shown by FIGS. 7 and 9, or two tanks and two recesses are provided as shown by FIG. 8. On the bottom 5 of the recesses is a conic or pyramidal protrusion 17 made of metal, synthetic resin or the like having a cut-out portion 16 at a position opposite to a bottom oil opening 15 (GIG. 10) in the oil supply tank 3d.

Figure 11A:
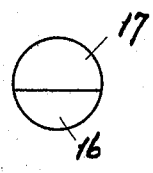
FIG. 11A and FIG. 12A are front views of protrusions which can be used for the holders of FIGS. 7–9.
Figure 11B:
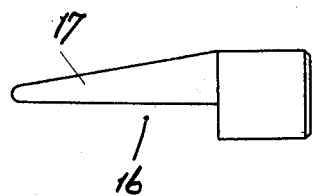
FIG. 11B and FIG. 12B are side views of the protrusions of FIGS. 11A and 12A.
Figure 12A:
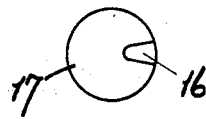
Figure 12B:
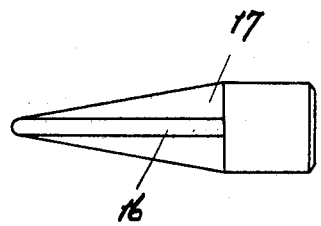

FIG. 11 and FIG. 12 show respectively protrusions 17 having different cut-out portions 16. FIG. 11 shows a conic protrusion having a cut-out portion extending in the axial direction and FIG. 12 shows a conic protrusion having a cut-out portion in the shape of a longitudinal groove.

If the protrusion is made of porous sintered metal, a cut-out portion is not necessarily required. Numeral 12 is an oil flow adjusting tank provided adjacent the recess 4 and is filled with an oil-retaining substance, such as felt, sponge, etc. The oil-retaining substance is disposed not only in the oil flow adjusting tank 12 but also disposed on the bottom 13 of said tank and the bottom 5 of the recess 4. Numeral 14 denotes a partition wall having an L-shape and made of synthetic resin or the like which also acts as a holder for the oil-retaining substance 6 and numeral 18 denotes a gap between the bottom of the oil supply tank 3d and the oil-retaining substance.

In the above structure, the oil supply tank is fitted in the recess 4 and the protrusion 17 is inserted into the oil opening 15, whereby oil in an amount corresponding to that which it is desired to have ooze onto the surface of ring 8 is exuded from the oil supply tank while air enters from the gap 18 between the oil supply tank and the oil-retaining substance and thus oil is led into the oil-retaining substance engaged tightly around the protrusion 17. Oil can be exuded from the oil supply tank by bringing the bottom surface of the oil supply tank 3d into tight contact with the oil-retaining substance, instead of providing the above-mentioned gap 18.

Figure 14:
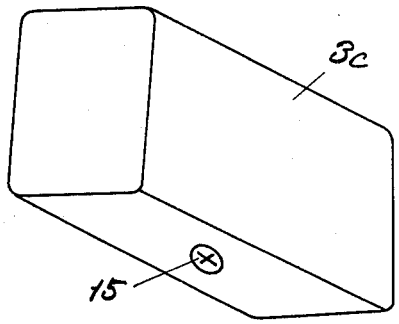
FIG. 10 and FIG. 14 are perspective views of further embodiments of the oil supply tank having in its bottom an oil aperture.
Figure 13:
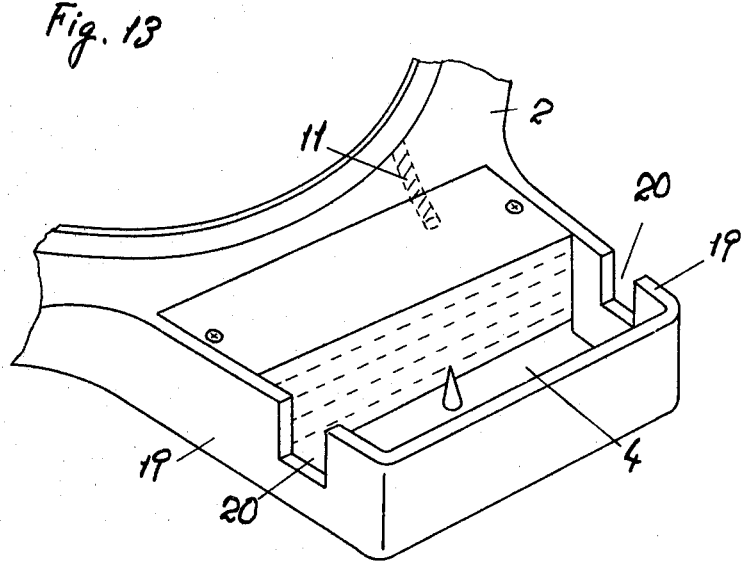
FIG. 13 is a perspective view of the main part of still another embodiment of the holder of the present invention.

Flow of the oil in the oil-retaining substance 6 is controlled in the oil flow adjusting tank 12 and is transferred to the circumference of the ring by means of capillary action in an oil feeding wick 11 extending from the tank 12 to the ring, so as to lubricate the surface of the ring 8. In the case where the recess 4 is surrounded with a wall as shown in FIG. 13, an opening 20 is provided in each end 19 so as to facilitate removal and insertion of the oil supply tank 3d as shown in FIG. 14.

In the above-described embodiment, the oil flow adjusting tank 12 is provided, but alternatively the oil feeding wick 11 can be brought into direct contact with the oil-retaining substance disposed at the bottom of the recess.

Figure 15:
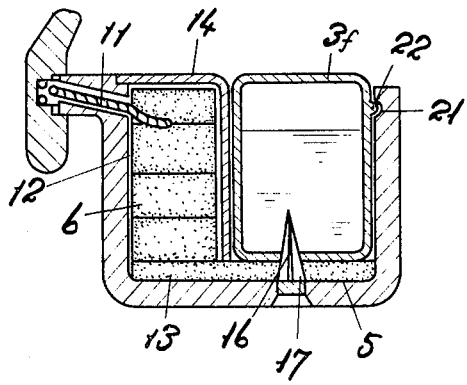
FIGS. 15–17 are sections similar to FIG. 3B of the main part of further embodiments of the holder of the present invention.
Figure 16:
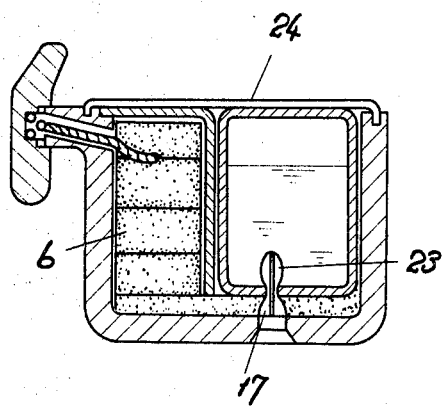
Figure 17:
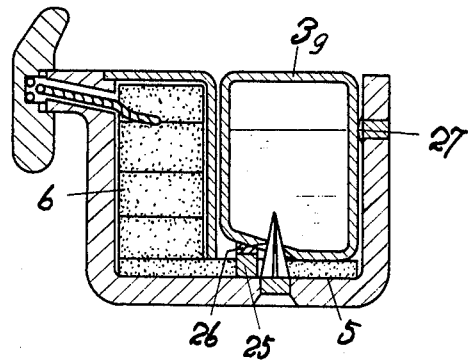

In the present invention, in order to prevent the oil supply tank from getting out of place or from springing out of the recess, a concave portion 21 and a convex portion 22 to engage with each other are provided in the recess 4 and in the oil supply tank 3f respectively as shown in FIG. 15, or the protrusion 17 has a bulge at its tip 23 and a clasp 24 is provided as shown in FIG. 16, or magnets 25 and 26 which are attracted to each other are provided at the bottoms of the oil supply tank 3g and the recess 4 and a protrusion 27 is provided, as shown in FIG. 17.

As is obvious from the above description, the structure of the present invention has such merits as smooth automatic lubrication to the ring, a larger oil storing capability due the larger capacity of the oil supply tank, less variations of oil supply, a prolonged interval between changes of the oil supply tank and a large decrease of the work necessary for oil supply due to adoption of the oil supply tank arrangement.

The present invention also prevents oil leakage at the time of oiling, and sticking of fly and the oil-stained cotton to oily surface of the ring holder, with the resultant elimination of oil-stained spun yarn.

What is claimed is:

1. The combination of a holder for the ring of ring spinning machine or a twisting machine, said holder having at least one upwardly open, closed bottom recess therein, an oil supply tank removably mounted in said recess said oil supply tank having in its bottom an oil opening, and an oil-retaining substance in the closed bottom of said recess and having a wick extending therefrom to the point of said holder where said ring is held for automatic lubrication of the ring.

2. The combination as claimed in claim 1, wherein the entire bottom of said oil supply tank is in tight contact with aid oil-retaining substance when the oil supply tank is in said recess.

3. The combination as claimed in claim 1, wherein said oil supply tank has a protrusion extending from the bottom through which said oil aperture extends and the outer end of the protrusion is in tight contact with the oil-retaining substance when the oil supply tank is in said recess.

4. The combination as claimed in claim 1, wherein said holder further has an oil flow adjusting tank disposed adjacent said recess for said supply tank and an oil-retaining substance disposed in said oil flow adjusting tank and in tight engagement with the oil-retaining substance in the bottom of said recess, said wick extending from said oil-retaining substance in said flow adjusting tank.

5. The combination as claimed in claim 1, wherein the portion of the holder around said recess in which the oil supply tank is fitted has a cut-out portion on opposite sides of said tank.

6. The combination as claimed in claim 1, further comprising means on said holder adjacent the recess for holding the oil supply tank tightly in the recess.

7. The combination as claimed in claim 1, wherein the bottom of said recess has an oil guide protrusion in tight contact with said oil-retaining substance and extending upwardly and fitting into the oil opening in the bottom of the oil supply tank.

8. The combination as claimed in claim 7, wherein said oil guiding protrusion is made of porous sintered metal.

9. The combination as claimed in claim 7, wherein said oil guiding protrusion is made of a hard non-porous material and has a cut-out portion therein.

* * * * *